3,432,302
SILVER HALIDE EMULSIONS CONTAINING SUPERSENSITIZING DYE COMBINATIONS
Jean E. Jones and Norman W. Kalenda, Rochester, N.Y., assignors to Eastman Kodak Company, Rochester, N.Y., a corporation of New Jersey
Filed May 24, 1965, Ser. No. 458,067
U.S. Cl. 96—104
Int. Cl. G03c 1/28
20 Claims

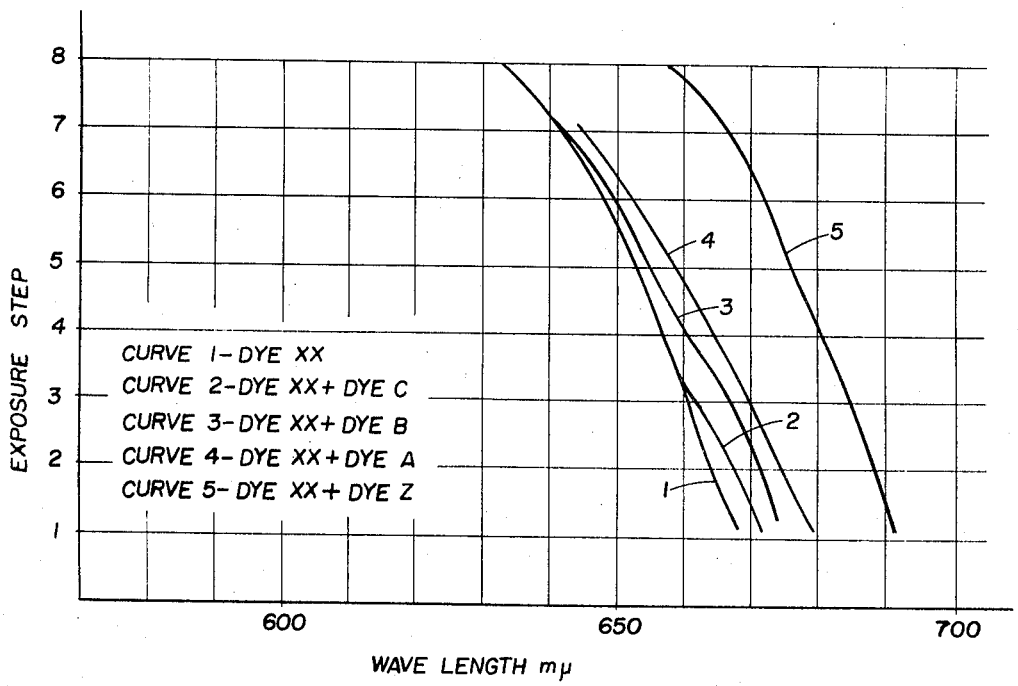

ABSTRACT OF THE DISCLOSURE

Photographic silver halide emulsions used in photographic elements are advantageously supersensitized by combinations of a chain substituted cyanine dye with a holopolar carbocyanine dye having a 4,5-dihydro-2-(1H)naphtho[1,2-d]thiazole nucleus and a naphtho[1,2-d]thiazole nucleus with a 5- to 6-membered acidic heterocycle nucleus as the holopolar group.

---

This invention relates to photographic silver halide emulsions containing certain cyanine dyes, and in particular to supersensitizing combinations therewith of certain holopolar carbocyanine dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have found an advantageous supersensitizing combination of certain cyanine dyes with certain holopolar carbocyanine dyes that sensitize silver halide emulsions to shorter wavelengths in the red region of the spectrum and also do not extend too far into the red region as compared with related supersensitizing dye combinations.

It is, accordingly, an object of our invention to provide photographic silver halide emulsions containing certain cyanine dyes and in combination therewith, certain holopolar carbocyanine dyes, that are of particular advantage in applications where for good color reproduction the required sensitization does not extend too far into the red region of the spectrum. Another object is to provide a means for preparing such supersensitized emulsions. Other objects will become apparent from a consideration of the following description and examples.

The cyanine dyes useful in practicing our invention include those dyes represented by the following formula:

(I)
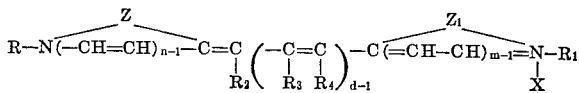

wherein $d$, $m$ and $n$ each represents a positive integer of from 1 to 2, R and $R_1$ each represents an alkyl group of from 1–12 carbon atoms, e.g., methyl, ethyl, propyl, isopropyl, butyl, isobutyl, amyl, decyl, dodecyl, β-hydroxyethyl, γ-hydroxypropyl, β-methoxyethyl, β-ethoxyethyl, allyl, benzyl, β-phenylethyl, β-sulfoethyl, γ-sulfopropyl, ω-sulfobutyl, carboxymethyl, β-carboxyethyl, γ-carboxypropyl, β-acetoxyethyl, carbomethoxyethyl, β-carbethoxyethyl, etc., $R_3$ represents a hydrogen atom, an alkyl group of from 1–4 carbon atoms, e.g., methyl, ethyl, etc., an aryl group, e.g., phenyl, p-tolyl, o-tolyl, naphthyl, etc., a heterocyclic group, e.g., 2-pyrryl, 3-pyrryl, 2-indolyl, 3-indolyl, 2-thienyl, 3-pyridyl, 4-pyridyl, or an anilino group; $R_2$ and $R_4$ each represents a hydrogen atom, or each of R and $R_2$ taken together represent a divalent alkylene group having from 2 to 3 carbon atoms in the chain, e.g., an ethylene or trimethylene group, said group completing a 5- or 6-membered heterocyclic ring, or $R_2$ and $R_3$ together represent a divalent alkylene group having 3 carbon atoms in the chain, e.g., a trimethylene group, said group completing a carbocyclic ring, or $R_2$ and $R_4$ taken together represent a divalent aryl group, e.g. an o-phenylene group, said group completing a carbocyclic ring, X represents an acid anion, e.g., chloride, bromide, iodide, thiocyanate, sulfamate, methyl sulfate, ethyl sulfate, perchlorate, p-toluenesulfonate, etc., and Z and $Z_1$ each represents the nonmetallic atoms required to complete a heterocyclic nucleus, especially a 5- or 6-membered heterocyclic nucleus, and particularly a 5- to 6-membered heterocyclic nucleus selected from the class comprising a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., α-naphthothiazole, β,β-naphthothiazole, β-naphthothiazole, 5-methoxy-β-naphthothiazole, 5-methoxy-β-naphthothiazole, 5-ethoxy-β-naphthothiazole, 8-methoxy-α-naphthothiazole, 7-methoxy-α-naphthothiazole, etc.), a thianaptheno-7',6',4,5-thiazole nucleus (e.g., 4'-methoxy-thianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.), a naphthoxazole nucleus (e.g., α-napthoxazole, β,β-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β,β-naphthoselenazole, β-naphthoselenazole, etc.), a thiazoline nucleus (e.g., thiazoline, 4-methylthiazoline, etc.), a 2-quinoline nucleus (e.g., 2-quinoline, 3-methyl-2-quinoline, 5-methyl-2-quinoline, 7-methyl-2-quinoline, 8-methyl-2-quinoline, 6-chloro-2-quinoline, 8-chloro-2-quinoline, 6-methoxy-2-quinoline, 6-ethoxy-2-quinoline, 6 - hydroxy - 2-quinoline, 8-hydroxy-2-quinoline, etc.), a 4-quinoline nucleus (e.g., 4-quinoline, 6-methoxy-4 - quinoline, 7 - methyl-4-quinoline, 8-methyl-4-quinoline, etc.), a 1-isoquinoline nucleus (e.g., 1-isoquinoline, 3,4 - dihydro - 1 - isoquinoline, etc.), a 3-isoquinoline nucleus (e.g., 3-isoquinoline, etc.), a 3,3-dialkylindolenine nucleus (e.g., 3,3 - dimethylindolinine, 3,3,5 - trimethylindolenine, 3,3,7 - trimethylindolenine, etc.), a 2-pyridine nucleus (e.g., 2-pyridine, 3-methyl-2-pyridine, 4-methyl-2-pyridine, 5-methyl-2-pyridine, 3,4-dimethyl-2-pyridine, 4-chloro - 2 - pyridine, 3-hydroxy-2-pyridine, 3-phenyl-2-pyridine, etc.), a 4 - pyridine nucleus (e.g., 2-methyl-4-pyridine, 3 - methyl-4-pyridine, 3-chloro-4-pyridine, 2,6-dimethyl - 4-pyridine, 3-hydroxy-4-pyridine, etc.), a 1-alkylimidazole nucleus (e.g., 1-methylimidazole, 1-ethyl-4 - phenylimidazole, 1-butyl-4,5-dimethylimidazole, etc.), a 1-alkylbenzimidazole nucleus (e.g., 1-methylbenzimidazole, 1 - butyl-4-methylbenzimidazole, 1-ethyl-5,6-dichlorobenzimidazole, etc.), a 1-alkylnaphthimidazole series (e.g., 1 - ethyl - α - naphthimidazole, 1-methyl-β-naphthimidazole, etc.), and the like nuclei.

The holopolar carbocyanine dyes useful in practicing our invention include those dyes represented by the formula:

II

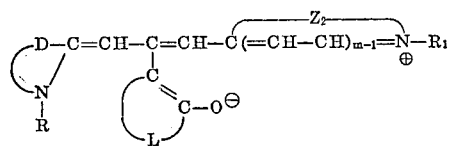

wherein R, $R_1$ and $m$ are as defined previously; L represents the non-metallic atoms required to complete a 5- to 6-membered acidic nucleus, such as, is found in any of the merocyanine dyes; and D represents the non-metallic atoms required to complete a nucleus, such as a 4,5-dihydronaphtho[1,2-d]thiazole nucleus
(e.g., 4,5-dihydronaphtho[1,2-d]thiazole,
6-ethyl-4,5-dihydronaphtho[1,2-d]thiazole,
7-phenyl-4,5-dihydronaphtho[1,2-d]thiazole,
8-chloro-4,5-dihydronaphtho[1,2-d]thiazole,
6-cyano-4,5-dihydronaphtho[1,2-d]thiazole,
6-sulfo-4,5-dihydronaphtho[1,2-d]thiazole,
7-acetoxy-4,5-dihydronaphtho[1,2-d]thiazole,
8-amino-4,5-dihydronaphtho[1,2-d]thiazole, etc.),
a 4,5-dihydronaphtho[1,2-d]selenazole nucleus
(e.g., 4,5-dihydronaphtho[1,2-d]selenazole,
6-chloro-4,5-dihydronaphtho[1,2-d]selenazole,
7-sulfo-4,5-dihydronaphtho[1,2-d]selenazole,
8-cyano-4,5-dihydronaphtho[1,2-d]selenazole,
7-acetoxy-4,5-dihydronaphtho[1,2-d]selenazole,
7-ethyl-4,5-dihydronaphtho[1,2-d]selenazole, etc.),
a 4,5-dihydronaphtho[1,2-d]oxazole nucleus
(e.g., 4,5-dihydronaphtho[1,2-d]oxazole,
6-chloro-4,5-dihydronaphtho[1,2-d]oxazole,
7-cyano-4,5-dihydronaphtho[1,2-d]oxazole,
8-methyl-4,5-dihydronaphtho[1,2-d]oxazole,
7-amino-4,5-dihydronaphtho[1,2-d]oxazole, etc.), and $Z_2$ represents the nonmetallic atoms required to complete a 5- to 6-membered heterocyclic nucleus such as has already been described for Z and $Z_1$.

Holopolar carbocyanine dyes of Formula II that are particularly advantageous in practicing our invention include dyes represented by the following formula:

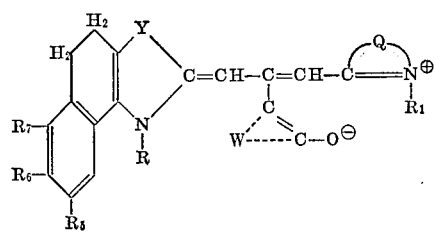

wherein R and $R_1$ are as previously defined, Q represents the non-metallic atoms required to complete a 4,5-dihydronaphtho[1,2-d]thiazole nucleus,
a 4,5-dihydronaphtho[1,2-d]selenazole nucleus, and
a 4,5-dihydronaphtho[1,2-d]oxazole nucleus as described previously for D and in addition a naphtho[1,2-d]thiazole nucleus
(e.g., naphtho[1,2-d]thiazole,
6-ethylnaphtho[1,2-d]thiazole,
7-phenylnaphtho[1,2-d]thiazole,
8-chloronaphtho[1,2-d]thiazole,
6-cyanonaphtho[1,2-d]thiazole,
6-sulfonapththo[1,2-d]thiazole, etc.),
a naphtho[1,2-d]selenazole nucleus
(e.g., naphtho[1,2-d]selenazole,
6-chloronaphtho[1,2-d]selenazole,
7-sulfonaphtho[1,2-d]selenazole,
8-cyanonaphtho[1,2-d]selenazole,
7-ethylnaphtho[1,2-d]selenazole, etc.),
a naphtho[1,2-d]oxazole nucleus
(e.g., naphtho[1,2-d]oxazole,
7-chloronaphtho[1,2-d]oxazole,
7-cyanonaphtho[1,2-d]oxazole,
8-methylnaphtho[1,2-d]oxazole,
7-aminonaphtho[1,2-d]oxazole, etc.), etc.; Y represents sulfur, selenium or oxygen; and W represents the non-metallic atoms required to complete a heterocyclic nucleus having from 5 to 6 atoms in the heterocyclic ring including heterocyclic nuclei such as a 2-pyrazolin-5-one nucleus
(e.g., 3-methyl-1-phenyl-2-pyrazolin-5-one,
1-phenyl-2-pyrazolin-5-one,
1-(2-benzothiazolyl)-3-methyl-2-pyrazolin-5-one, etc.),
an isoxazolone nucleus
(e.g., 3-phenyl-5(4H)-isoxazolone,
3-methyl-5-(4H)-isoxazolone, etc.),
an oxindole nucleus
(e.g., 1-alkyl-2,3-dihydro-2-oxindoles, etc.),
a 2,4,6-triketohexahydropyrimidine nucleus or
a 4,6-diketo-2-thiohexahydropyrimidine nucleus (e.g., barbituric acid or 2-thiobarbituric acid as well as their 1-alkyl (e.g., 1-methyl,
1-ethyl,
1-propyl,
1-heptyl, etc.),
or 1,3-dialkyl
(e.g., 1,3-dimethyl,
1,3-diethyl,
1,3-dipropyl,
1,3-diisopropyl,
1,3-dicyclohexyl,
1,3-di(β-methoxyethyl), etc.),
or 1,3-diaryl
(e.g., 1,3-diphenyl,
1,3-di(p-chlorophenyl),
1,3-di(p-ethoxycarbonylphenyl), etc.),
or 1-aryl
(e.g., 1-phenyl,
1-p-chlorophenyl,
1-p-ethoxycarbonylphenyl), etc.)
or 1-alkyl-3-aryl
(e.g., 1-ethyl-3-phenyl,
1-n-heptyl-3-phenyl, etc.) derivatives),
a rhodanine nucleus (i.e., 2-thio-2,4-thiazolidinedione nucleus),
such as rhodanine,
3-alkylrhodanines
(e.g., 3-ethylrhodanine,
3-allylrhodanine, etc.),
3-carboxyalkylrhodanines
(e.g., 3-(2-carboxyethyl)rhodanine,
3-(4-carboxybutyl)rhodanine, etc.), 3-sulfoalkylrhodanines
(e.g., 3-(2-sulfoethyl)rhodanine,
3-(3-sulfopropyl)rhodanine,
3-(4-sulfobutyl)rhodanine, etc.),
or 3-arylrhodanines
(e.g., 3-phenylrhodanine, etc.), etc.,
a 2(3H)-imidazo[1,2-a]pyridone nucleus,
a 5,7-dioxo-6,7-dihydro-5-thiazolo[3,2-a]pyrimidine nucleus
(e.g., 5,7-dioxo-3-phenyl-6,7-dihydro-5-thiazolo-[3,2-a]pyrimidine, etc.),
a 2-thio-2,4-oxazolidinedione nucleus
(i.e., a 2-thio-2,4(3H,5H)-oxazoledione nucleus)
(e.g., 3-ethyl-2-thio-2,4-oxazolidinedione,
3-(2-sulfoethyl)-2-thio-2,4-oxazolidinedione,
3-(4-sulfobutyl)-2-thio-2,4-oxazolidinedione,
3-(3-carboxypropyl)-2-thio-2,4-oxazolidinedione, etc.),
a thianaphthenone nucleus
(e.g., 3-(2H)-thianaphthenone, etc.),
a 2-thio-2,5-thiazolidinedione nucleus
(i.e., the 2-thio-2,5(3H,4H)-thiazoledione nucleus)
(e.g., 3-ethyl-2-thio-2,5-thiazolidinedione, etc.),
a 2,4-thiazolidinedione nucleus
(e.g., 2,4-thiazolidinedione,
3-ethyl-2,4-thiazolidinedione,
3-phenyl-2,4-thiazolidinedione,
3-α-naphthyl-2,4-thiazolidinedione, etc.),
a thiazolidinone nucleus
(e.g., 4-thiazolidinone,
3-ethyl-4-thiazolidinone,
3-phenyl-4-thiazolidinone,
3-α-naphthyl-4-thiazolidinone, etc.),
a 2-thiazolin-4-one nucleus
(e.g., 2-ethylmercapto-2-thiazolin-4-one,
2-alkylphenylamino-2-thiazolin-4-one,
2-diphenylamino-2-thiazolin-4-one, etc.),
a 2-imino-4-oxazolidinone
(i.e., pseudohydantoin) nucleus,
a 2,4-imidazolidinedione (hydantoin) nucleus
(e.g., 2,4-imidazolidinedione,
3-ethyl-2,4-imidazolidinedione,
3-phenyl-2,4-imidazolidinedione,
3-α-naphthyl-2,4-imidazolidinedione,
1,3-diethyl-2,4-imidazolidinedione,
1-ethyl-3-phenyl-2,4-imidazolidinedione,
1-ethyl-3-α-naphthyl-2,4-imidazolidinedione,
1,3-diphenyl-2,4-imidazolidinedione, etc.),
a 2-thio-2,4-imidazolidinedione
(i.e. 2-thiohydantoin) nucleus
(e.g., 2-thio-2,4-imidazolidinedione,
3-ethyl-2-thio-2,4-imidazolidinedione,
3-(4-sulfobutyl)-2-thio-2,4-imidazolidinedione,
3-(2-carboxyethyl)-2-thio-2,4-imidazolidinedione,
3-phenyl-2-thio-2,4-imidazolidinedione,
3-α-naphthyl-2-thio-2,4-imidazolidinedione,
1,3-diethyl-2-thio-2,4-imidazolidinedione,
1-ethyl-3-phenyl-2-thio-2,4-imidazolidinedione,
1-ethyl-3-α-naphthyl-2-thio-2,4-imidazolidinedione,
1,3-diphenyl-2-thio-2,4-imidazolidinedione, etc.),
a 2-imidazolin-5-one nucleus
(e.g., 2-n-propylmercapto-2-imidazolin-5-one, etc.),
etc., $R_5$, $R_6$ and $R_7$ each represents the same or a different group selected from the hydrogen atom, a lower alkyl group (e.g., methyl, ethyl, propyl, butyl, etc.), a lower alkoxy group (e.g., methoxy, ethoxy, butoxy, etc.), an aryl group (e.g., phenyl, tolyl, etc.), a halogen atom (e.g., chlorine, bromine, etc.), a sulfo group (including ammonium and alkali metal salts thereof), a carboxy group (including the ammonium and alkali metal salts thereof), an alkoyloxy group (e.g., acetoxy, propionyloxy, etc.), an alkoxycarbonyl group having from 2 to 10 carbon atoms (e.g., methoxycarbonyl, butoxycarbonyl, decoxycarbonyl, etc.), etc. The compounds of Formula IIA wherein W represents the barbituric acid nucleus such as represented by Dyes A, B and C set forth hereinafter are especially efficacious.

According to our invention, we incorporate with light-sensitive silver halide one or more of the cyanine dyes represented by Formula I above with one or more of the holopolar carbocyanine dyes represented by Formula II above. Our invention is particularly directed to the ordinarily employed gelatino-silver-halide developing-out emulsions. However, our supersensitizing combinations can be employed in silver halide emulsions in which the carrier or vehicle is a hydrophilic colloid other than gelatin, such as, for example, albumin, agar-agar, gum arabic, alginic acid, etc., or a hydrophilic resin such as polyvinyl alcohol, polyvinyl pyrrolidone, a cellulose ether, a partially hydrolyzed cellulose acetate, etc., which has no deleterious effect upon the light-sensitive silver halide.

The dyes of Formula I and Formula II can be employed in the combinations of the invention in various concentrations depending upon the particular emulsion, concentration of the silver halide, particular results desired, etc.

The optimum concentration of an individual sensitizing dye can be determined in a manner well known to those skilled in the art by measuring the sensitivity of a series of test portions of the same emulsion, each portion containing a different concentration of the sensitizing dye.

The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing, combination, it is advantageous to employ, at first, concentrations of the individual dyes less than their optimum concentrations. The concentrations of the individual dyes can then be increased until the optimum concentration of the supersensitizing combination is determined.

The methods of incorporating sensitizing dyes in silver halide emulsions are well known to those skilled in the art and these known techniques are employed in dispersing the cyanine dyes of Formula I, and holopolar carbocyanine dyes, of our invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the dyes can be separately dissolved in a given solvent and added separately to the emulsion, or they can be dissolved in the same or different solvent and these solutions mixed together before addition is made to the silver halide emulsions. The cyanine dyes of Formula I, and holopolar carbocyanine dyes of Formula II can be dispersed in the finished emulsions and should be uniformly distributed throughout the emulsions before the emulsions are coated on a suitable support, such as paper, glass, cellulose ester film, polyvinyl resin film (e.g., polystyrene film, polyvinyl chloride film, etc.), polyester film, etc. The following procedure has been found quite satisfactory: Stock solutions of the cyanine dyes of Formula I and holopolar carbocyanine dyes are prepared by separately dissolving these dyes in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, our invention is directed to any silver halide emulsion containing a combination of the aforesaid dyes whereby a supersensitizing effect is obtained.

To different portions of the same batch of photographic gelatino-silver-bromoiodide emulsion were added (1) a cyanine dye of Formula I, (2) a holopolar carbocyanine dye of Formula II and (3) a combination of the dyes of (1) and (2). The emulsions were held for a short time at about 50–52° C., coated on a transparent support, chill set and dried. The coatings were then exposed to daylight quality radiation through either a yellow Wratten #16 Filter which transmits substantially no light of wavelength shorter than about 520 mµ, a red Wratten #29 Filter which transmits substantially no light of wavelength shorter than about 610 mµ, or a combination of a Wratten #16 Filter and a green Wratten #61 Filter which latter transmits only light of wavelength lying between 480 and 600 mµ. The filter was selected to correspond to the maximum sensitizing region of the particular cyanine dye illustrated. The exposed coatings were then processed for three minutes in a developer having the following composition:

|   | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make one liter. | |

The speed, gamma and fog for each of the coatings was then measured. The same emulsion batch was used for the coatings of each example, although not all of the examples used the same emulsion batch.

Included among the dyes of Formula I above are the following dye compounds:

| Dye No. | Compound |
|---|---|
| I | 3,3′-dimethyl-9-phenyl-4,5,4′,5′-dibenzothiacarbocyanine bromide. |
| II | 3,3′-dimethyl-9-ethyl-4,5,4′,5′-dibenzothiacarbocyanine chloride. |
| III | 3,3′-dimethyl-9-methyl-4,5,4′,5′-dibenzothiacarbocyanine bromide. |
| IV | 9-ethyl-3,3′-dimethyl-5′-phenyl-4,5-benzothiacarbocyanine p-toluenesulfonate. |
| V | 9-ethyl-1′,3-dimethylthia-2′-carbocyanine iodide. |
| VI | 3,3′-diethyl-9-(2-thienyl)-4,5,4′,5′-dibenzothiacarbocyanine p-toluenesulfonate. |
| VII | 3,3′-diethyl-9-(4-pyridyl)-4,5,4′,5′-dibenzothiacarbocyanine p-toluenesulfonate. |
| VIII | 3,3′-dimethyl-9-N-methylanilino-4,5,4′,5′-dibenzothiacarbocyanine iodide. |
| IX | 3,3′,9-triethyl-4′,5′-benzoselenathiacarbocyanine iodide. |
| X | 3,3′-diethyl-9-methyl-4,5,4′,5′-dibenzoselenathiacarbocyanine iodide. |
| XI | 3,3′-dimethyl-9-ethyl-oxacarbocyanine iodide. |
| XII | 3,3′,9-triethyl-5,6,5′,6′-dibenzooxacarbocyanine p-toluenesulfonate. |
| XIII | 3,3′-dimethyl-9-(2-methyl-3-indolyl)-4,5,4′,5′-dibenzothiacarbocyanine p-toluenesulfonate. |
| XIV | 5,5′-dichloro-3,3′,9-triethylthiacarbocyanine bromide. |
| XV | 3,3′,9-triethyl-5,6,5′,6′-dibenzothiacarbocyanine p-toluenesulfonate. |
| XVI | 9-(2,5-dimethyl-1-phenyl-3-pyrryl)-3,3′-dimethyl-4,5,4′,5′-dibenzothiacarbocyanine iodide. |
| XVII | 3,3′-dimethyl-9-(2-pyrryl)-4,5,4′,5′-dibenzothiacarbocyanine p-toluenesulfonate. |
| XVIII | 3,3′-diethyl-9-(3-pyridylmethobromide)-4,5,4′,5′-dibenzothiacarbocyanine bromide. |
| XIX | 3,3′-diethyl-9-(3-pyridylethiodide)-4,5,4′,5′-dibenzothiacarbocyanine iodide. |
| XX | 3,3′-dimethyl-5,5′,9-triphenylthiacarbocyanine p-toluenesulfonate. |
| XXI | 3,3′-dimethyl-5,5′,9-triphenylthiacarbocyanine p-toluenesulfonate. |
| XXII | 3,3′-diethyl-4,5,4′,5′-dibenzothiacarbocyanine bromide. |
| XXIII | 3,3′-diethylthiacarbocyanine iodide. |
| XXIV | 1,3′-diethyl-3-phenylbenzimidazolooxacarbocyanine perchlorate. |
| XXV | 3,3′-diethyloxacarbocyanine iodide. |
| XXVI | 1,1′-diethyl-2,2′-cyanine iodide. |
| XXVII | 3,3′-diethyl-9-methyl-8,10-o-phenylenethiacarbocyanine iodide. |
| XXVIII | 3,3′-diethyl-8,9-trimethylene-4,5,4′,5′-dibenzothiacarbocyanine iodide. |
| XXIX | 5′-chloro-3,3′-diethyl-8,9-trimethylene-4,5-benzothiacarbocyanine iodide. |
| XXX | 3,3′-dimethyl-9-phenyl-8,10-o-phenylenethiacarbocyanine iodide. |

| Dye No. | Compound |
|---|---|
| XXXI | 3′-ethyl-9-methyl-3,8-trimethylenethiacarbocyanine bromide. |
| XXXII | 3′-ethyl-3,8-ethylene-9-methylthiacarbocyanine bromide. |
| XXXIII | 3′-ethyl-3,8-ethylene-9-phenyl-4,5,4′,5′-dibenzothiacarbocyanine iodide. |
| XXXIV | 3,8-(1,3-butylene)-3′-ethyl-9-phenyl-4,5,4′,5′-dibenzothiacarbocyanine iodide. |
| XXXV | 3,8,3′,10-Di(1,3-butylene)-9-methylthiacarbocyanine iodide. |
| XXXVI | 9-ethyl-3,8,3′,10-ditrimethylenethiacarbocyanine p-toluenesulfonate. |
| XXXVII | 3,8,3′-10-diethylenethiacarbocyanine salt. |
| XXXVIII | 3,3′-diethyl-1,10-trimethylenenaphtha[2,3]imidazolothiacarbocyanine iodide. |
| XXXIX | 3,3′-diethyl-1′,10-ethylene-4,5-benzothianaphtha[2,3]imidazolocarbocyanine p-toluenesulfonate. |
| XL | 3-ethyl-3′,10-trimethylenethiacarbocyanine iodide. |
| XLI | 3,8′,3′,10-di(1,3-butylene)-4,5,4′,5′-dibenzothiacarbocyanine iodide. |
| XLII | 3′,10-ethylene-5-phenyl-3,8-trimethyleneoxathiacarbocyanine bromide. |
| XLIII | 3,8,3′,10-ditrimethylene-5,6,5′,6′-dibenzooxacarbocyanine iodide. |
| XLIV | 8,10-ethylene-3,3′-dimethylthiacarbocyanine iodide. |
| XLV | 3-ethyl-3′,10-ethyleneoxathiacarbocyanine iodide. |
| XLVI | 3-ethyl-3′,10-ethylenethiacarbocyanine iodide. |
| XLVII | 3,8-(1,3-butylene)-3′-ethyl-4,5-benzooxathiacarbocyanine iodide. |
| XLVIII | 3′-ethyl-3,8-trimethylene-5,6-benzooxathiacarbocyanine iodide. |

Included among the dyes of Formula II above are the following typical dye compounds.

| Dye No. | Compound |
|---|---|
| A | 1,3-diethyl-5-[(1-ethyl-4,5-dihydro-2(1H)-naphtho-[1,2-d]thiazolylidene)(1-methyl-2(1H)-naphtho-[1,2-d]thiazolylidene)-isopropylidene]-barbituric acid. |
| B | 1,3-diethyl-5-[(1-ethyl-4,5-dihydro-2(1H)-naphtho-[1,2-d]thiazolylidene)(1-ethyl-2(1H)-naphtho[1,2-d]thiazolylidene)-isopropylidene]barbituric acid. |
| C | 1,3-diethyl-5-[(1-ethyl-4,5-dihydro-2(1H)-naphtho-[1,2-d]thiazolylidene)(3-ethyl-2(3H)-naphtho[2,1-d]thiazolylidene)-isopropylidene]barbituric acid. |
| D | 1,3-diethyl-5-[(1-ethyl-4,5-dihydro-2(1H)-naphtho[1,2-d]selenazolylidene)(1-methyl-2(1H)naphtho-[1,2-d]thiazolylidene)isopropylidene]-thiobarbituric acid. |
| E | 3-ethyl-5-[(7-acetoxy-1-ethyl-4,5-dihydro-2(1H)-naphtho-[1,2-d]thiazolylidene)(1-methyl-2(1H)-naphtho[1,2-d]oxazolylidene)isopropylidene]-rhodanine. |
| F | 1,3-diethyl-5-[(1-ethyl-6-sulfo-4,5-dihydro-2(1H)-naphtho-[1,2-d]thiazolylidene)(1-methyl-2(1H)-naphtho[1,2-d]-oxazolylidene)isopropylidene]hydantoin. |
| G | 1,3-diethyl-5-[(6-chloro-1-ethyl-4,5-dihydro-2(1H)-naphtho-[1,2-d]thiazolylidene)(1-methyl-2(1H)-naphtho[1,2-d]-oxazolylidene)isopropylidene]-thiohydantoin. |
| H | 1,3-diethyl-5-[(1-ethyl-6-phenyl-4,5-dihydro-2(1H)-naphtho-[1,2-d]thiazolylidene)(1-methyl-2(1H)-naphtho[1,2-d]-oxazolylidene)isopropylidene]-thiobarbituric acid. |
| I | 4,4-dimethyl-2-[(6-cyano-1-ethyl-4,5-dihydro-2(1H)-naphtho-[1,2-d]thiazolylidene)(1-methyl-2(1H)-naphtho[1,2-d]selenazolylidene)isopropylidene]-1,3-cyclobutanedione. |
| J | 1,3-diethyl-5-[1,3-bis(1-ethyl-4,5-dihydro-2(1H)-naphtho-[1,2-d]selenazolylidene)isopropylidene]-barbituric acid. |
| K | 1,3-diethyl-5-[1,3-bis(1-ethyl-4,5-dihydro-2(1H)-naphtho-[1,2-d]thiazolylidene)isopropylidene]-barbituric acid. |

The following examples further illustrate our invention.

Example 1

A silver bromoiodide emulsion was made of the type described by Trivelli and Smith, Phot. Journal, vol. 79, 330 (1939). The melted emulsion was divided into separate portions to which were added a solution of the dye sensitizers I, A, B, C and combinations of I with A, B and C as indicated in Table 1. Each portion was digested at 50° C. for 10 minutes, coated on a film support and dried. The dried samples were given identical exposure through a Wratten #29 filter on an Eastman Sensitometer (Type 1B) for ⅕ second to a tungsten light source and processed for three minutes in the above mentioned developer solution, fixed in a conventional sodium thiosulfate fixing bath, washed and dried. Densitometric measurements were made of the developed images on each coating. The relative speed values were calculated on an arbitrary relative speed of 100 for the coating sensitized with 0.08 g. of Dye I per mol. of silver halide, and the gamma values determined. These values along with the fog values are shown in Table 1 below.

TABLE 1

| Dye and concentration (g./mol. silver halide) | Relative speed | Gamma | Fog |
|---|---|---|---|
| I (0.08) | 100 | 2.60 | .06 |
| I (0.08)+A (0.02) | 501 | 2.68 | .06 |
| I (0.08)+B (0.02) | 513 | 2.80 | .06 |
| I (0.08)+C (0.02) | 457 | 2.80 | .06 |
| A (0.02) | 32 | 2.90 | .04 |
| B (0.02) | 1.8 | 3.10 | .04 |
| C (0.02) | 74 | 3.20 | .04 |

The above table shows that the supersensitizing dye combinations of Dye I with Dyes A, B and C were sharply higher in relative speeds as compared with those found with the individual dyes. For example, the combination of Dye I with Dye A produced a relative speed of 501, whereas the individual dyes produced relative speeds of but 100 and 32, respectively.

Example 2

Coatings were made as in Example 1, excepting that dye sensitizers II to X and combinations of A, B and C with these others, were used, as indicated in Table 2. These coatings were exposed, processed and densitometric measurements made as described in Example 1. The relative speed (based on 100 for Dye II), gamma and for values obtained are listed in the following Table 2.

TABLE 2

| Dye and concentration (g./mol. silver halide) | Relative speed | Gamma | Fog. |
|---|---|---|---|
| II (0.08) | 100 | 2.92 | .05 |
| II (0.08)+A (0.02) | 145 | 2.78 | .04 |
| II (0.08)+B (0.02) | 151 | 2.98 | .04 |
| III (0.08) | 44 | 2.66 | .04 |
| III (0.08)+A (0.02) | 60 | 2.70 | .04 |
| IV (0.08) | 42 | 2.90 | .04 |
| IV (0.08)+A (0.02) | 100 | 2.78 | .05 |
| V (0.08) | 20 | 1.80 | .04 |
| V (0.08)+A (0.02) | 110 | 2.10 | .05 |
| V (0.08)+B (0.02) | 95 | 2.14 | .04 |
| V (0.08)+C (0.02) | 60 | 1.89 | .04 |
| VI (0.08) | 34 | 3.16 | .05 |
| VI (0.08)+A (0.02) | 132 | 3.02 | .04 |
| VI (0.08)+B (0.02) | 126 | 3.06 | .04 |
| VI (0.08)+C (0.02) | 110 | 3.02 | .04 |
| VII (0.08) | 8.7 | 2.76 | .04 |
| VII (0.08)+A (0.02) | 48 | 2.92 | .04 |
| VIII (0.08) | 35.5 | 2.96 | .04 |
| VIII (0.08)+A (0.02) | 80 | 3.12 | .05 |
| IX (0.08) | 33 | 2.20 | .05 |
| IX (0.08)+A (0.02) | 46 | 2.00 | .06 |
| X (0.08) | 40 | 2.56 | .04 |
| X (0.08)+A (0.02) | 53 | 2.66 | .04 |

The supersensitizing dye combinations listed in the above table show in every case of comparison a substantially higher relative speed than do the individual Dyes II to X.

Example 3

Coatings were made as in Example 1, excepting that dye sensitizers XI, XII, A and combinations of A with XI and XII, were used. These coatings were exposed, processed and the density measurements made as described in Example 1 excepting that a combination of Wratten #16 and Wratten #61 Filters was used in place of a Wratten #29 Filter. The results are shown in Table 3 below.

TABLE 3

| Dye and concentration (g./mol. silver halide) | Relative speed | Gamma | Fog. |
|---|---|---|---|
| XI (0.08) | 100 | 1.98 | .05 |
| XI (0.08)+A (0.02) | 589 | 2.80 | .05 |
| XII (0.08) | 776 | 2.86 | .06 |
| XII (0.08)+A (0.02) | 1,780 | 2.94 | .07 |
| A (0.02) | 0 | | .05 |

The relative speeds (based on 100 for Dye XI) are approximately 6 times greater for the dye combination of Dye XI+A, and approximately 2 times greater for the dye combination of Dye XII+A than the values for the individual Dyes XI and XII.

Example 4

Coatings were made as in Example 1, excepting that dye sensitizers XIII to XIX, A, B, C and combinations of A, B and C with these others, were employed. The coatings were exposed, processed and the density measurements made as described in Example 1. The relative speed (based on 100 for Dye XIII), gamma and fog values obtained are listed in the following Table 4.

TABLE 4

| Dye and concentration (g./mol. silver halide) | Relative speed | Gamma | Fog |
|---|---|---|---|
| XIII (0.08) | 100 | 2.80 | .06 |
| XIII (0.08)+A (0.02) | 289 | 2.86 | .07 |
| XIII (0.08)+B (0.02) | 182 | 2.93 | .07 |
| XIII (0.08)+C (0.02) | 126 | 2.90 | .07 |
| XIV (0.08) | 269 | 2.34 | .07 |
| XIV (0.08)+A (0.02) | 316 | 2.52 | .07 |
| XV (0.08) | 186 | 2.50 | .09 |
| XV (0.08)+A (0.02) | 219 | 2.60 | .08 |
| XVI (0.08) | 28 | 2.82 | .06 |
| XVI (0.08)+A (0.02) | 166 | 2.88 | .07 |
| XVII (0.08) | 120 | 2.78 | .07 |
| XVII (0.08)+A (0.02) | 316 | 2.62 | .06 |
| XVIII (0.08) | 3.7 | 2.70 | .05 |
| XVIII (0.08)+A (0.02) | 50 | 2.72 | .06 |
| XIX (0.08) | 27 | 2.60 | .07 |
| XIX (0.08)+A (0.02) | 94 | 2.60 | .06 |
| A (0.02) | 29.5 | 3.26 | .07 |
| B (0.02) | 1.15 | 3.30 | .06 |
| C (0.02) | 49 | 3.40 | .06 |

It will be noted that the supersensitizing dye combinations in the above table, in each case of comparison, show relative speeds substantially greater than do the individual dyes.

Example 5

This example demonstrates that the supersensitizing dye combinations of the invention sensitize silver halide emulsions to shorter wavelengths in the red region of the spectrum than do related combinations. Thus, in the following Table 5, a comparison is made of dye combinations of dye sensitizers XX and XXI with A, B and C (containing a 4,5-dihydro-β-naphthothiazole nucleus), and dye combinations of XX and XXI with Dye Z (containing just the simple β-naphthothiazole nucleus, i.e. the dye compound 5 [di(1-ethyl-2(1H)-β-naphthothiazolylidene)-isopropylidene]-1,3-di-(β-methoxyethyl) barbiturate acid.

Coatings were made as in Example 1. These were exposed, processed and the density measurements made as described in Example 1 except that a Wratten #16 Filter was used in place of a Wratten #29 Filter. The wavelength in microns to which the film had maximum sensitivity, the relative speeds (based on 100 for Dye XX), gammas and fog values are listed in Table 5.

TABLE 5

| Dye and concentration (g./mol. silver halide) | Maximum Sensitivity (Microns) | Relative Speed | Gamma | Fog |
|---|---|---|---|---|
| XX (0.083) | .630 | 100 | 1.55 | .09 |
| XX (0.083)+A (0.018) | .640 | 132 | 1.65 | .08 |
| XX (0.083)+B (0.018) | .640 | 135 | 1.73 | .08 |
| XX (0.083)+C (0.018) | .630 | 166 | 1.88 | .09 |
| XX (0.083)+Z (0.02) | 635,.665 | 174 | 1.65 | .08 |
| XXI (0.083) | .635 | 73 | 1.60 | .08 |
| XXI (0.083)+A (0.018) | .645 | 129 | 1.47 | .08 |
| XXI (0.083)+B (0.018) | .640 | 115 | 1.59 | .08 |
| XXI (0.083)+C (0.018) | .640 | 120 | 1.48 | .08 |
| XXI (0.083)+Z (0.02) | 635,.660 | 159 | 1.56 | .08 |
| A (0.018) | .650 | 12.6 | 1.80 | .06 |
| B (0.018) | .625 | 11.1 | 1.88 | .06 |
| C (0.018) | .645 | 32 | 1.64 | .05 |
| Z (0.02) | (1) | Slight image | | .06 |

[1] Not measurable.

It will be seen from the above table that though the combinations of Dyes XX and XXI with Dye Z produce comparable relative speeds, gammas and fog values, their maximum sensitivity (Col. 2 of Table 5) occurs at substantially longer wavelengths in the red region of the spectrum as compared with the maximums produced for the combinations of the invention. In other words, the expected maximums are shifted to substantially shorter wavelengths by use of Dyes A, B and C containing the 4,5-dihydro-β(α or β,β)-naphthothiazole nucleus.

Example 6

Coatings were made as in Example 1, excepting that dye sensitizers XXII to XLVIII and A and combinations of A with these others, were used. These coatings were exposed through a Wratten #16 Filter (Table 6) or through a Wratten #29 Filter (Table 7) as indicated in the tables, processed and the relative speed (based on 100 for Dyes XXII, XXXII, XXXVII and XXXVIII), gamma and fog values determined. The results obtained are listed in the following Tables 6 and 7.

TABLE 6

| Dye and concentration (g./mol. silver halide) | Relative speed | Gamma | Fog |
| --- | --- | --- | --- |
| XXII (0.08) | 100 | 1.72 | .06 |
| XXII (0.08)+A (0.02) | 135 | 1.63 | .06 |
| XXIII (0.08) | 35.5 | 1.44 | .06 |
| XXIII (0.08)+A (0.02) | 78 | 1.52 | .06 |
| XXIV (0.08) | 4 | 1.63 | .05 |
| XXIV (0.08)+A (0.02) | 44 | 1.58 | .04 |
| XXV (0.08) | 3 | 1.50 | .06 |
| XXV (0.08)+A (0.02) | 55 | 1.57 | .04 |
| XXVI (0.08) | 23 | 1.34 | .06 |
| XXVI (0.08)+A (0.02) | 155 | 1.40 | .07 |
| XXVII (0.08) | 13.2 | 1.61 | .06 |
| XXVII (0.08)+A (0.02) | 118 | 1.53 | .06 |
| XXVIII (0.08) | 25 | 1.38 | .06 |
| XXVIII (0.08)+A (0.02) | 34 | 1.35 | .05 |
| XXIX (0.08) | 8.7 | 1.14 | .05 |
| XXIX (0.08)+A (0.02) | 27 | 1.44 | .04 |
| XXX (0.08) | 38 | 1.79 | .06 |
| XXX (0.08)+A (0.02) | 58 | 1.97 | .06 |
| XXXI (0.08) | 132 | 1.37 | .06 |
| XXXI (0.08)+A (0.02) | 251 | 1.64 | .05 |
| XXXIII (0.08) | 9.5 | 1.58 | .06 |
| XXXIII (0.08)+A (0.02) | 87 | 1.79 | .06 |
| XXXIV (0.08) | 50 | 1.69 | .06 |
| XXXIV (0.08)+A (0.02) | 182 | 1.68 | .06 |
| XXXVI (0.08) | 67 | 1.54 | .06 |
| XXXVI (0.08)+A (0.02) | 91 | 1.40 | .06 |
| A (0.02) | Too small to measure | | .06 |
| XXXVII (0.08) | 100 | 0.96 | .16 |
| XXXVII (0.08)+A (0.02) | 174 | 0.91 | .10 |
| XLI (0.08) | 631 | 1.07 | .07 |
| XLI (0.08)+A (0.02) | 725 | 1.12 | .06 |
| XLII (0.08) | 603 | 1.14 | .20 |
| XLII (0.08)+A (0.02) | 871 | 1.29 | .06 |
| XLIV (0.08) | 347 | 1.36 | .12 |
| XLIV (0.08)+A (0.02) | 1,860 | 1.53 | .10 |
| XLV (0.08) | 372 | 1.18 | .14 |
| XLV (0.08)+A (0.02) | 871 | 1.43 | .04 |
| XLVII (0.08) | 257 | 1.15 | .06 |
| XLVII (0.08)+A (0.02) | 550 | 1.26 | .06 |
| A (0.02) | Too small to measure | | .06 |

TABLE 7

| Dye and concentration (g./mol. silver halide) | Relative speed | Gamma | Fog |
| --- | --- | --- | --- |
| XXXII (0.08) | 100 | 1.31 | .06 |
| XXXII (0.08)+A (0.02) | 417 | 1.77 | .06 |
| XXXV (0.08) | 30 | 1.54 | .06 |
| XXXV (0.08)+A (0.02) | 110 | 1.31 | .04 |
| A (0.02) | None | | .06 |
| XXXVIII (0.08) | 100 | 1.28 | .06 |
| XXXVIII (0.08)+A (0.02) | 832 | 0.92 | .06 |
| XXXIX (0.08) | 1,290 | 1.28 | .24 |
| XXXIX (0.08)+A (0.02) | 2,090 | 1.55 | .10 |
| XL (0.08) | 331 | 0.90 | .08 |
| XL (0.08)+A (0.02) | 631 | 1.02 | .06 |
| XLIII (0.08) | 6.3 | 0.90 | .12 |
| XLIII (0.08)+A (0.02) | 316 | 1.20 | .07 |
| XLVI (0.08) | 479 | 1.30 | .07 |
| XLVI (0.08)+A (0.02) | 1,100 | 1.57 | .06 |
| XLVIII (0.08) | 11.5 | 0.94 | .06 |
| XLVIII (0.08)+A (0.02) | 276 | 0.95 | .06 |
| A (0.02) | None | | .06 |

It will be noted that the supersensitizing combinations listed in Tables 6 and 7 above, show in each case of comparison substantially higher relative speeds than do the individual Dyes XXII to XLVIII.

Further evidence that the supersensitizing dye combinations of the invention result in sensitizing to shorter wave-lengths in the red region of the spectrum is furnished by the accompanying graphs derived from long wavelength cut-off of the respective spectrograms. The wavelength at which density reaches 0.3 is plotted for each exposure step. These steps differ by 0.3 log E with Step 1 being that of the greatest exposure. Referring to FIG. 1 and specifically to Step 1, it will be noted that comparison dye combination XX+Z has the value 691 mµ, whereas XX+A, XX+B and XX+C dye combinations of the invention have the substantially lesser wavelength values of 679 mµ and 671 mµ, 674 mµ, respectively. Dye XX by itself has the value 668 mµ. The respective curves are substantially parallel with each other in their lengths.

The immediate sensitizing dye combinations provide a valuable technical advance because of their desirable spectral sensitizing effects and particularly because of the shift of the λ max. values to shorter wavelengths as illustrated by the drawings.

The cyanine dyes coming under Formula I above include many well known dyes. Such dyes can advantageously be prepared in accordance with the processes of a number of patents such as Brooker U.S. Patent 1,861,836, issued June 7, 1932; Brooker U.S. Patent 1,934,657, issued Nov. 7, 1933; Brooker U.S. Patent 1,950,876, issued Mar. 13, 1934; White U.S. Patent 1,990,681, issued Feb. 12, 1935; Kostlowsky U.S. Patent 2,107,379, issued Feb. 8, 1938; Brooker U.S. Patent 2,112,140, issued Mar. 22, 1938; Brooker U.S. Patent 2,202,827 issued July 4, 1940; Brooker U.S. Patent 2,241,237, issued May 6, 1941; Carroll et al. U.S. Patent 2,369,646, issued Feb. 20, 1945; Carroll et al. U.S. Patent 2,369,657, issued Feb. 20, 1945; Van de Straete U.S. Patent 2,484,536, issued Oct. 11, 1949; Keyes U.S. Patent 2,486,173, issued Oct. 25, 1949; Van Zandt et al. U.S. Patent 2,515,913, issued July 18, 1950, Dent et al. U.S. Patent 2,537,880, issued Jan. 9, 1959; Heseltine et al. U.S. Patent 2,666,761, issued Jan. 19, 1954; Jones U.S. Patent 2,751,298, issued June 19, 1956; etc.

Cyanine dyes of Formula I in which $R_2$ combined with $R_3$ or $R_4$ to form a bridged structure are described by Kendall U.S. Patent 2,265,909 issued Dec. 9, 1941. I.G.F. British Patent 483,045 accepted Apr. 7, 1938, etc. Cyanine dyes of Formula I in which R and $R_2$ are combined to form a bridged structure such as ethylene, trimethylene, etc. are described in Lincoln and Heseltine U.S. Ser. No. 226,757, filed Sept. 27, 1962. The synthesis of 1,2-alkylene imidazole bases and the corresponding cyclammonium quaternary salts is described in Lincoln and Brooker U.S. Ser. No. 226,756, filed Sept. 27, 1962; these intermediates are used to advantage to make other dyes of Formula I by methods well known in the art.

The dyes of Formula II are readily prepared by well known processes for preparing holopolar dyes such as are described by Brooker et al. U.S. 2,739,964 issued Mar. 27, 1956 and reissued on Mar. 19, 1957, as Re. 24,292. For example, they are prepared to advantage by condensing a quaternary salt having the general formula:

III 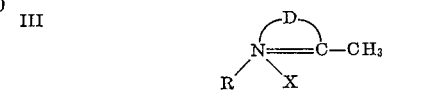

wherein R, D, X and Y are as defined previously, with a compound having the formula:

IV 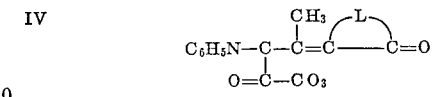

wherein L is as defined previously, preferably by heating in the presence of a basic condensing agent followed by condensing the merocarbocyanine dye formed above, with a cyclammonium quaternary salt having the formula:

V 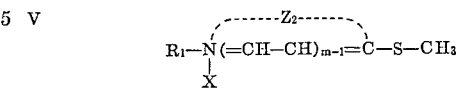

wherein $R_1$, X, $Z_2$ and $m$ are as defined previously. The intermediate compounds of Formula III are prepared to advantage by quaternizing the corresponding hydrogenated products described in Copeland U.S. Patent 2,942,003, issued June 21, 1960. The intermediates of Formulas IV and V and their preparation are well known in the art having been described in numerous patents.

The dyes of Formula IIa are prepared by the same process as the dyes of Formula II but by condensing a compound of the formula:

VI

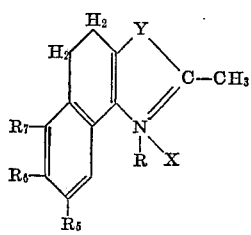

wherein R, $R_5$, $R_6$, $R_7$, Y and X are as defined previously by heating with a compound having the Formula IV followed by condensing the merocarbocyanine dye formed above with a cyclammonium quaternary salt having the formula:

VII

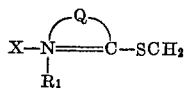

wherein X, Q and $R_1$ are as defined previously.

The invention has been described in detail with particular reference to preferred embodiments thereof but it will be understood that variations and modifications can be effected within the spirit and scope of the invention as described hereinabove and as defined in the appended claims.

We claim:
1. A photographic silver halide emulsion containing a supersensitizing combination of (1) a dye compound having the general formula:

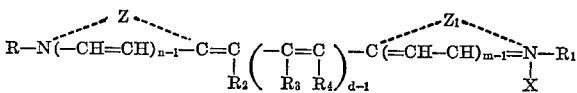

and (2) a holopolar dye compound having the general formula:

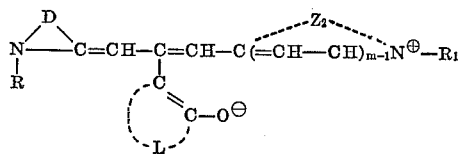

wherein $d$, $m$ and $n$ each represents an integer of from 1 to 2, R and $R_1$ each represents an alkyl group of from 1 to 12 carbon atoms, $R_3$ represents a member selected from the class consisting of the hydrogen atom, an alkyl group of from 1 to 4 carbon atoms, a phenyl group, a naphthyl group, a pyrryl group, an indolyl group, a thieenyl group, a pyridyl group and an anilino group; $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_3$ taken together represent a trimethylene group, $R_2$ and $R_4$ taken together represent an o-phenylene group, X represents an acid anion, Z and $Z_1$ each represents the nonmetallic atoms required to complete a 5- to 6-membered heterocyclic nucleus, $Z_2$ represents the nonmetallic atoms required to complete a heterocyclic nucleus selected from the class consisting of a 4,5-dihydronaphtho[1,2-d]thiazole nucleus and a naphtho [1,2-d] thiazole nucleus, D represents the nonmetallic atoms required to complete a 4,5-dihydronaphtho[1,2-d]thiazole nucleus, and L represents the nonmetallic atoms required to complete an acidic nucleus selected from the group consisting of a barbituric acid nucleus, a thiobarbituric acid nucleus, a rhodanine nucleus, a hydantoin nucleus, a thiohydantoin nucleus and a 1,3-cyclobutanedione nucleus.

2. A photographic element comprising a support coated with at least one silver halide emulsion layer containing a supersensitizing combination of (1) a chain-substituted carbocyanine dye having the general formula:

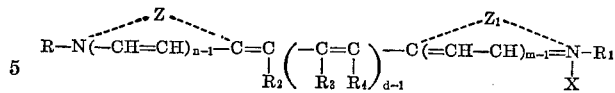

and (2) a holopolar dye compound having the general formula:

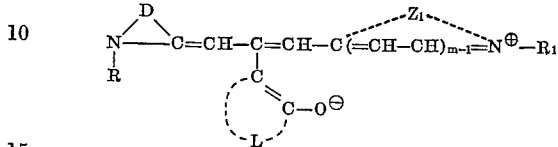

wherein $d$, $m$ and $n$ each represents an integer of from 1 to 2, R and $R_1$ each represents an alkyl group of from 1 to 12 carbon atoms, $R_3$ represents a member selected from the class consisting of the hydrogen atom, an alkyl group of from 1 to 4 carbon atoms, a phenyl group, a naphthyl group, a pyrryl group, an indolyl group, a thienyl group, a pyridyl group and an anilino group; $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_3$ taken together represent a trimethylene group, $R_2$ and $R_4$ taken together represent an o-phenylene group, X represents an acid anion, Z and $Z_1$ each represents the nonmetallic atoms required to complete a 5- to 6-membered hetrocyclic nucleus, $Z_2$ represents the nonmetallic atoms required to complete a heterocyclic nucleus selected from the class consisting of a 4,5-dihydronaphtho[1,2-d]thiazole nucleus and a naphtho[1,2-d]thiazole nucleus, D represents the nonmetallic atoms required to complete a 4,5-dihydronaphtho[1,2-d]thiazole nucleus, and L represents the nonmetallic atoms required to complete an acidic nucleus selected from the group consisting of a barbituric acid nucleus, a thiobarbituric acid nucleus, a rhodanine nucleus, a hydantoin nucleus, a thiohydantoin nucleus and a 1,3-cyclobutanedione nucleus.

3. A photographic silver halide emulsion containing a supersensitizing combination (1) a dye compound having the general formula:

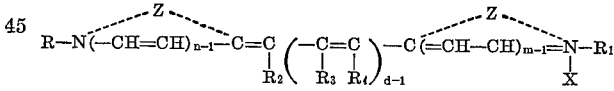

and (2) a holopolar dye compound having the general formula:

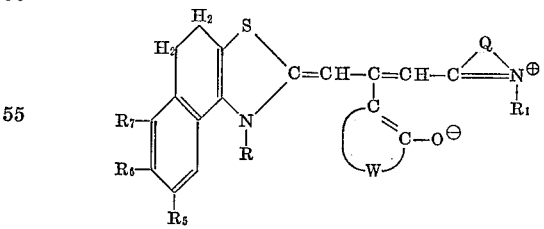

wherein $d$, $m$ and $n$ each represents an integer of from 1 to 2, R and $R_1$ each represents an alkyl group of from 1 to 12 carbon atoms, $R_3$ represents a member selected from the class consisting of the hydrogen atom, an alkyl group of from 1 to 4 carbon atoms, a phenyl group, a naphthyl group, a pyrrl group, an indolyl group, a thienyl group, a pyridyl group and an anilino group; $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_3$ taken together represent a trimethylene group, $R_2$ and $R_4$ taken together represent an o-phenylene group, X represents an acid anion, Z and $Z_1$ each represents the nonmetallic atoms required to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, an imidazole nucleus, a benzimidazole nucleus, a naphthimidazole nucleus, a 3,3-dialkylindolenine nucleus, and a pyridine nucleus; Q represents the nonmetallic atoms required to complete a naphtho[1,2-d]thiazole nucleus, W represents the nonmetallic atoms required to complete a barbituric acid nucleus, $R_5$, $R_6$ and $R_7$ each represents a member selected from the class consisting of hydrogen, a lower alkyl group, a lower alkoxy group, an aryl group, a halogen atom, the cyano group, a sulfo group, and an alkoyloxy group and an alkoxy carbonyl group.

4. A photographic element comprising a support coated with at least one silver halide emulsion layer containing a supersensitizing combination of (1) a chain-substituted carbocyanine dye having the general formula:

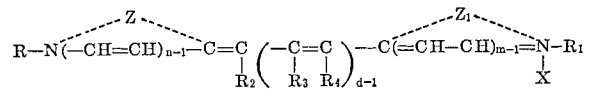

and (2) a holopolar dye compound having the general formula:

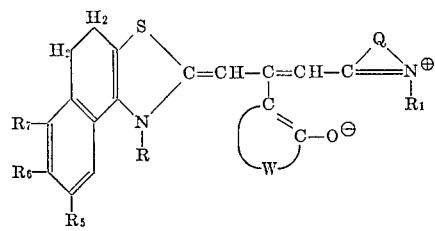

wherein $d$, $m$ and $n$ each represents an integer of from 1 to 2, R and $R_1$ each represents an alkyl group of from 1 to 12 carbon atoms, $R_3$ represents a member selected from the class consisting of the hydrogen atom, an alkyl group of from 1 to 4 carbon atoms, a phenyl group, a naphthyl group, a pyrryl group, an indolyl group, a thienyl group, a pyridyl group and an anilino group; $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_3$ taken together represent a trimethylene group, $R_1$ and $R_4$ taken together represent an o-phenylene group, X represents an acid anion, Z and $Z_1$ each represents the nonmetallic atoms required to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, an imidazole nucleus, a benzimidazole nucleus, a naphthimidazole nucleus, a 3,3-dialkylindolenine nucleus, and a pyridine nucleus, Q represents the nonmetallic atoms required to complete a naphtho[1,2-d]thiazole nucleus, W represents the nonmetallic atoms required to complete a barbituric acid nucleus, $R_5$, $R_6$ and $R_7$ each represents a member selected from the class consisting of hydrogen, a lower alkyl group, a lower alkoxy group, an aryl group, a halogen atom, the cyano group, a sulfo group, and an alkoyloxy group and an alkoxy carbonyl group.

5. A photographic silver halide emulsion containing a supersensitizing combination of claim 3 in which the holopolar carbocyanine dye is 1,3-diethyl-5-[(1-ethyl-4,5-dihydro - 2(1H) - naphtho[1,2 - d]thiazolylidene)(1-methyl - 2(1H) - naphtho[1,2 - d]thiazolylidene) - isopropylidene]barbituric acid.

6. A photographic silver halide emulsion containing a supersensitizing combination of claim 3 in which the holopolar carbocyanine dye is 1,3-diethyl-5-[(1-ethyl-4,5-dihydro - 2(1H) - naphtho[1,2 - d]thiazolylidene)(1-ethyl - 2(1H) - naphtho[1,2 - d] - thiazolylidene) - isopropylidene]barbituric acid.

7. A photographic silver halide emulsion containing a supersensitizing combination of claim 3 in which the holopolar carbocyanine dye, is 1,3-diethyl-5-[(1-ethyl-4,5-dihydro-2(1H) - naphtho[1,2 - d]thiazolylidene)(3 - ethyl-2(3H) - naphtho - [2,1-d]thiazolylidene)-isopropylidene] barbituric acid.

8. A photographic silver halide emulsion containing a supersensitizing combination of 3,3'-dimethyl-9-phenyl-4,5,4'5'-dibenzothiacarbocyanine bromide with 1,3-diethyl - 5[(1-ethyl-4,5-dihydro-2(1H)-naphtho[1,2-d]thiazolylidene)(1-methyl-2(1H) - naphtho[1,2 - d]thiazolylidene)-isopropylidene]barbituric acid.

9. A photographic silver halide emulsion containing a supersensitizing combination of 3,3'-dimethyl - 9 - phenyl-4,5,4',5'-dibenzothiacarbocyanine bromo with 1,3-diethyl-5-[(1-ethyl-4,5-dihydro - 2(1H)-naphtho[1,2-d]thiazolylidene)(3-ethyl - 2(3H)-naphtho[2,1-d]thiazolylidene)-isopropylidene]barbituric acid.

10. A photographic silver halide emulsion containing a supersensitizing combination of 3,3'-dimethyl-9-ethyl-oxacarbocyanine iodide with 1,3-diethyl-5-[(1-ethyl-4,5-dihydro - 2(1H) - naphtho[1,2 - d]thiazolylidene)(1 - methyl-2(1H)-naphtho-[1,2 - d]thiazolylidene) - isopropylidene] barbituric acid.

11. A photographic silver halide emulsion containing a supersensitizing combination of 8,10-ethylene-3,3'-dimethyl-thiacarbocyanine iodide with 1,3-diethyl-5-](1-ethyl-4,5-dihydro - 2(1H) - naphtho[1,2 - d]thiazolylidene)(1-methyl - 2(1H)-naphtho[1,2-d]thiazolylidene)-isopropylidene]barbituric acid.

12. A photographic silver halide emulsion containing a supersensitizing combination of 3,3'-dimethyl-5,5'-9-triphenylthiacarbocyanine p-toluenesulfonate with 1,3-diethyl-5-[(1-ethyl-4,5-dihydro - 2(1H)-naphtho[1,2-d]thiazolylidene)(3-ethyl - 2(3H)-naphtho[2,1-d]thiazolylidene)-isopropylidene]barbituric acid.

13. A photographic element comprising a support coated with at least one layer containing a supersensitizing combination of claim 4 in which the holopolar carbocyanine dye is 1,3-diethyl-5-[(1-ethyl-4,5-dihydro-2(1H) naphtho-[1,2-d]thiazolylidene)(1-methyl-2(1H)-naphtho-[1,2-d]thiazolylidene)isopropylidene]barbituric acid.

14. A photographic element comprising a support coated with at least one layer containing a supersensitizing combination of claim 4 in which the holopolar carbocyanine dye is 1,3-diethyl-5-[(1-ethyl-4,5-dihydro-2(1H) naphtho[1,2 - d]thiazolylidene)(1 - ethyl-2(1H)-naphtho-[1,2-d]thiazolylidene)isopropylidene]barbituric acid.

15. A photographic element comprising a support coated with at least one layer containing a supersensitizing combination of claim 4 in which the holopolar carbocyanine dye is 1,3-diethyl-5-[(1-ethyl-4,5-dihydro-2(1H) naphtho[1,2 - d]thiazolylidene)(3 - ethyl-2(3H)-naphtho-[2,1-d]thiazolylidene)isopropylidene]barbituric acid.

16. A photographic element comprising a support coated with at least one layer containing a photographic silver halide emulsion containing a supersensitizing combination of 3,3'-dimethyl-9-phenyl-4,5,4',5'-dibenzothiacarbocyanine bromide with 1,3-diethyl-5-[(1-ethyl-4,5-dihydro - 2(1H)-naphtho[1,2-d]thiazolylidene)(1-methyl-2-(1H)-naphtho[1,2 - d]-thiazolylidene)isopropylidene]barbituric acid.

17. A photographic element comprising a support coated with at least one layer containing a photographic silver halide emulsion containing a supersensitizing combination of 3,3'-dimethyl-9-phenyl-4,5,4',5'-dibenzothiacarbocyanine bromide with 1,3-diethyl-5-[(1-ethyl-4,5-dihydro - 2(1H)-naphtho[1,2-d]thiazolylidene)(3-ethyl - 2-(3H)-naphtho[2,1 - d]thiazolylidene)isopropylidene]barbituric acid.

18. A photographic element comprising a support coated with at least one layer containing a photographic silver halide emulsion containing a supersensitizing combination of 3,3'-dimethyl-9-ethyl-oxacarbocyanine iodide with 1,3-diethyl - 5-[(1-ethyl-4,5-dihydro-2(1H)-naphtho[1,2 - d]thiazolylidene)( 1- methyl-2(1H)-naphtho[1,2-d]thiazolylidene)isopropylidene]barbituric acid.

19. A photographic element comprising a support coated with at least one layer containing a photographic silver halide emulsion containing a supersensitizing combination of 8,10-ethylene-3,3'-dimethylthiacarbocyanine idode with 1,3-diethyl - 5 - [(1-ethyl - 4,5-dihydro-2(1H) naphtho[1,2 - d]thiazolylidene)(1-methyl-2(1H)-naphtho-[1,2-d]thiazolylidene)isopropylidene]barbituric acid.

20. A photographic element comprising a support coated with at least one layer containing a photographic silver halide emulsion containing a supersensitizing combination of 3,3'-dimethyl-5,5',9-triphenylthiocarbocyanine p-toluene-sulfonate with 1,3-diethyl-5-[(1-ethyl-4,5-dihydro-2(1H) - naphtho[1,2 - d]thiazolylidene)(3 - ethyl - 2-(3H)-naphtho[2,1 - d]thiazolylidene)isopropylidene]barbituric acid.

References Cited
UNITED STATES PATENTS

| | | |
|---|---|---|
| 2,704,714 | 3/1955 | Carroll et al. _____ 96—104 |
| 2,704,715 | 3/1955 | Carroll et al. _____ 96—104 |
| 2,704,720 | 3/1955 | Jones _____ 96—104 |

J. TRAVIS BROWN, Primary Examiner.

U.S. Cl. X.R.

96—105

PO-1050
(5/69)

UNITED STATES PATENT OFFICE
CERTIFICATE OF CORRECTION

Patent No. 3,432,302      Dated March 11, 1969

Inventor(s) Jean E. Jones & Norman W. Kalenda (USN 458,067)

It is certified that error appears in the above-identified patent and that said Letters Patent are hereby corrected as shown below:

Column 1, line 18, "heterocyclc" should read --heterocyclic--.
Column 14, approximate line 10, that portion of the formula reading $Z_1$ should read $Z_2$ ;

approximate line 45, that portion of the formula in the right half thereof reading $Z$ should read $Z_1$ .

Column 15, line 50, "$R_1$" should read --$R_2$--. Column 16, line 11, after "dye", delete ","; line 23, "bromo" should read --bromide--; line 35, that portion of formula reading "1,3-diethyl-5̲7̲(1-" should read --1,3-diethyl-5-/⎯(1- --; line 40, that portion of formula reading "-5,5'-9-" should read --5,5',9- --; lines 48-49, that portion of formula reading "-2(1H)naphtho-" should read -2(1H)-naphtho; lines 54-55, that portion of formula reading "-2(1H)naphtho" should read -- -2(1H)-naphtho; lines 60-61, that portion of formula reading "-2(1H)naphtho" should read -- -2(1H)-naphtho --. Column 17, line 15, "idode" should read --iodide--; lines 15-16, that portion of formula reading "-2(1H)naphtho" should read -- -2(1H)-naphtho --.

Signed and sealed this 6th day of July 1971.

(SEAL)
Attest:

EDWARD M. FLETCHER, JR.
Attesting Officer

WILLIAM E. SCHUYLER, JR.
Commissioner of Patents